United States Patent [19]

Vincent et al.

[11] Patent Number: 4,766,011

[45] Date of Patent: Aug. 23, 1988

[54] RESTORING STRANDED CONDUCTOR ELECTRICAL DISTRIBUTION CABLE

[75] Inventors: Gary A. Vincent; Daniel F. Meyer, both of Midland, Mich.

[73] Assignee: Dow Corning Corporation, Midland, Mich.

[21] Appl. No.: 947,134

[22] Filed: Dec. 29, 1986

[51] Int. Cl.$^4$ .............................................. B05D 5/12
[52] U.S. Cl. .................................... 427/117; 427/118; 427/140
[58] Field of Search ....................... 427/117, 118, 140

[56] References Cited

U.S. PATENT DOCUMENTS

| | | | |
|---|---|---|---|
| 3,252,834 | 5/1966 | Vincent | 427/117 |
| 3,939,882 | 2/1976 | Gillemot | 156/48 |
| 4,042,776 | 8/1977 | Matsuba | 427/117 |
| 4,144,202 | 3/1979 | Ashcraft | 524/585 |
| 4,206,260 | 6/1980 | McMahon | 428/500 |
| 4,212,756 | 7/1980 | Ashcraft | 427/117 |
| 4,299,713 | 11/1981 | Maringer | 427/117 |
| 4,360,539 | 11/1982 | Sachtleben | 427/117 |
| 4,372,988 | 2/1983 | Bahder | 427/117 |
| 4,400,429 | 8/1983 | Barlow | 427/117 |
| 4,401,491 | 8/1983 | Modic | 427/117 |
| 4,608,306 | 8/1986 | Vincent | 524/265 |

FOREIGN PATENT DOCUMENTS

| | | | |
|---|---|---|---|
| 2737430 | 2/1979 | Fed. Rep. of Germany | 427/117 |
| 2805875 | 8/1979 | Fed. Rep. of Germany | 427/117 |

OTHER PUBLICATIONS

English translation of DE 2805875 and DE 2737430.

Primary Examiner—Shrive P. Beck
Assistant Examiner—Vi Duong Dang
Attorney, Agent, or Firm—Alexander Weitz

[57] ABSTRACT

A method for restoring stranded conductor, polyolefin insulated electrical distribution cable which comprises supplying the interstices of the conductor of said cable with aromatic radical containing silane such as phenyltrimethoxysilane or phenylmethyldimethoxysilane, and mixtures, and partial hydrolyzates thereof.

10 Claims, No Drawings

RESTORING STRANDED CONDUCTOR ELECTRICAL DISTRIBUTION CABLE

The present invention relates to a method of restoring polyolefin insulated stranded conductor distribution cable which has significant deterioration in its performance due to electrical and/or water treeing of its insulation. Stranded distribution cables are well known in the art and are characterized by having a conductor comprised of multiple conductor wires which are wound or woven together. Because of the nature of the conductor there are void interstices in the conductor portion of the cable. Electrical distribution cables are exposed to both significant amounts of moisture and high electrical fields. After a period of time, exposure to these conditions leads to the degradation of the cables performance as a conductor. Upon close inspection, the insulation of such aged cables shows microscopic voids in the shape of trees which are known as electrical and water tree voids.

Electrical and water treeing are gradual degradative processes. Electrical treeing is caused by internal electrical discharges in the dielectric material. High voltage impulses in conjunction with internal voids and contaminants in the insulation material contribute to this form of treeing. This failure mechanism results in the breakdown of the molecular structure of the polyolefin insulation material.

Water treeing is caused by simultaneous exposure of the cable insulation material to both an electrical field and water. Underground distribution cables are particularly susceptible to this form of treeing. Unlike electrical trees, water trees are characterized by water being essential to their formation, by the fact that no partial discharge is detectable during much of their formation, by taking several years to form, and by the fact that they can be formed at relatively low electrical fields.

The causes of these forms of breakdown are not completely understood, but a great deal of work has been done to prevent such processes from degrading cable insulation materials, A large number of patents exist which deal with additives that can be compounded with the insulation material to render the material resistant to the formation of electrical and water treeing processes. See, for instance, the German Pat. Nos. DE 2,737,430 and DE 2,805,875 which teach that treeing can be suppressed by compounding aromatic radical containing alkoxy functional silanes into polyolefin insulation. U.S. Pat. No. 4,299,713 teaches that treeing can be retarded by compounding alkoxy functional silanes into polyolefin insulation.

While the above references teach methods of producing polyolefin insulation which resists treeing processes they do not teach a method for restoring in service cable which already has tree voids formed in its insulation. Some work has been done in regards to restoring the polyolefin insulation of stranded conductor cable which has already been tree deteriorated. For instance, U.S. Pat. No. 3,252,834 issued to Vincent teaches a method for restoring aged cable which comprises introducing a treatment composition comprised of 5 to 10 wt % unsaturated polyester varnish, 10 to 20 wt % polymerized silicone resin, 0.5 to 5 wt % insecticide and 65 to 85 wt % solvent to the stranded cable interstices. U.S. Pat. No. 3,939,882 issued to Gillemont teaches a method for restoring cable where liquid polyurethane precursor is pumped into the interstices of a stranded cable conductor and allowed to polymerize to an elastomeric substance in the cable. The filled cable is thus less susceptible to moisture penetration along the conductor interstices. U.S. Pat. No. 4,372,988 issued to Bahder teaches a method of restoring cable comprised of: drying said cable with a dessicant gas; continuously introducing an electrochemical tree retardant liquid to said conductor so as to cause the tree retardant liquid to diffuse between the conductor and the insulation material; Bahder's tree retardant liquid has certain dielectric properties. but is not reactive with water. Bahder does not teach using alkoxy functional silanes as tree retardant liquids, nor does Bahder teach a method for providing alkoxy functional tree retardant materials to the cable. None of these methods of restoration address filling the voids formed by treeing degradation with a material which reacts with the water in the voids to form tree retardant materials which are less mobile than silanes.

SUMMARY OF THE INVENTION

The present invention relates to a method of restoring electrical distribution cables which have lowered performance due to treeing. This method comprises supplying the interstices of the stranded conductor portion of said cable with a tree retardant organosilicon fluid which comprises:

(a) aromatic radical containing silanes of the general formula

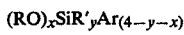
$$(RO)_x SiR'_y Ar_{(4-y-x)}$$

where R denotes an alkyl radical with 1 to 6 carbon atoms. R' denotes an alkyl radical with 1 to 6 carbon atoms, Ar denotes an aromatic organic radical chosen from the group consisting of phenyl and benzyl radicals, y is 0, 1 or 2, x is 1, 2 or 3, $x+y \leq 3$, where said fluid has an initial viscosity at 25° C. of less than 20 centistokes and mixtures and partial hydrolyzate thereof.

DETAILED DESCRIPTION OF THE INVENTION

This invention relates to a method of restoring electrical and chemical tree aged, stranded wire, electrical distribution cables to serviceable levels of performance and imparting tree retardancy to the insulation material of the treated cable. The central aspect of the inventive method is the step of supplying a tree retardant organosilicon fluid to the interstices of the stranded conductor of the cable where said fluid comprises aromatic radical containing silanes of the general formula

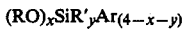
$$(RO)_x SiR'_y Ar_{(4-x-y)}$$

where R denotes an alkyl radical with 1 to 6 carbon atoms, R' denotes an alkyl radical with 1 to 6 carbon atoms. Ar denotes an aromatic organic radical chosen from the group consisting of phenyl and benzyl radicals, x is 1, 2 or 3, where y is 0, 1 or 2 and $x+y \leq 3$, where said fluid has an initial viscosity at 25° C. of less than 20 centistokes. The organosilicon fluid may also be a mixture of silanes of the above formula or partial hydrolyzates of a silane or a mixture of silanes.

The prior art teaches methods of purging stranded conductor cable of moisture and introducing into the center portion of the cable a fluid or varnish solution in order to form a barrier to further penetration of the conductor with water. However, the art does not teach a method of restoring cable which fills the tree voids with a material that will react with the water in those voids and form a polymerized product which will keep water from penetrating into those voids. In the present invention, the tree retardant fluid is supplied to the interstices of the conductor cable until a sufficient portion of the fluid is absorbed by the polyolefin insulation of the distribution cable to effectively act as an antitreeing agent. The tree retardant fluid of the present invention will react with the water in the tree voids and condenses to form a polysiloxane material of sufficient viscosity that it will not exude from the polyolefin material as rapidly as acetophenone or unhydrolyzed silanes. This is in contrast to prior art methods employing acetophenone where the tree retardant effect imparted to the insulation decreases as the acetophenone exudes from the treated insulation material. In the present method, after polymerization to a higher viscosity in the insulation material, the tree retardant becomes less mobile, and is less able to exude from the cable. This increases the durability of the treeing retardancy imparted to the cable.

The silanes comprising the tree retardant organosilicon fluid supplied to the interstices of the distribution cable in the present invention are known as anti-treeing additives for polyolefin insulation. Typically, these silanes are compounded into the polyolefin insulation material. In the present invention the silanes serve two purposes; one, to act as anti-treeing additives by condensing with the water found in the microvoids of the already formed trees to form a condensed polysiloxane which retards further water entry into the tree void; and second, to provide an additional supply of tree retardant liquid in the conductor voids, which prevents the spread of the water along the conductor.

Specific silanes which can be used in the practice of the present invention include, but are not limited to, phenylmethyldimethoxysilane, diphenyldimethoxysilane, benzylmethyldimethoxysilane, phenyltrimethoxysilane, phenyldimethylmethoxysilane, diphenylmethylmethoxysilane, phenylmethyldiethoxysilane, and mixtures thereof. Mixtures are particularly favored because of the control over the rate of increase in viscosity one skilled in the art can effect by carefully maintaining the correct ratio of dialkoxy to trialkoxy functional silane ratios. The mixture of silanes can range from 100 wt % trialkoxysilanes to 100 wt % dialkoxysilanes. Particular mixtures include by weight: 90% phenylmethyldimethoxysilane and 10% phenyltrimethoxysilane; 80% diphenyldimethoxysilane and 20% phenyltrimethoxysilane. Preferred mixtures include: 5 to 95 weight percent phenylmethyldimethoxysilane and 5 to 95 weight percent phenyltrimethoxysilane. More preferred mixtures are 80 to 95 weight percent phenylmethyldimethoxysilane and 5 to 20 weight percent phenyltrimethoxysilane. It should be understood that the most favored combination of silanes should be that combination which allows the fastest absorption of the anti-treeing silanes, in that they allow for the most time effective restoration of tree aged cables, while still providing a mobile gel which slows the exudation rate of the tree retardant from the cable insulation. The organosilicon fluid should be capable of curing in the presence of atmospheric moisture to a mobile gel having a viscosity of at least about 100 centistokes at 25° C. within 2000 hours of being subjected to atmospheric moisture.

Partially hydrolyzed mixtures of silanes can also be used in the practice of the invention, in that oligomers formed by the partial hydrolysis and condensation of the silanes can be used in the present method. The only limits on the degree of polymerization of the silane mixture are the initial viscosity of the fluid as it is supplied to the interstices of the cable, and the permeability of the fluid into the polyolefin insulation material. The initial viscosity must remain less than about 20 centistokes at 25° C., and the average molecular weight of the fluid must be low enough to permit the fluid to permeate the polyolefin material, which can be measured by weight gain of polyolefin. Typical effective treatment levels require a 1 to 5 weight percent gain in the polyolefin in less than 200 hours at room temperature and pressure.

The mixture of silanes may further comprise a hydrolysis condensation catalyst in order to increase the viscosity of the fluid to provide a more effective moisture barrier within the interstices of the distribution cable should moisture penetrate the insulation. The amount of catalyst employed should allow the fluid to permeate the insulation before forming a more viscous fluid in the polyolefin insulation material which will not easily exude from the cable insulation. Formation of the more viscous fluid in the polyolefin insulation controls the rate at which the anti-treeing agent will exude from the insulation, and will effectively prolong the treated life of the insulation. Typically the catalyst should be employed in amounts between 0.05 and 5 grams per 100 grams of the fluid.

Catalysts which can be used in the present invention include, but are not limited to, organic metal compounds like the carboxylic acid salts of metals such as tin, manganese, iron, cobalt, nickel, lead, and the like, or organometallic compounds of titanium or zirconium. Specific catalyst types include alkyl titanates, acyl titanates and the corresponding zirconates. Particular preferred compounds include dibutyltindiacetate, dibutyltindilaurate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate.

The insulation material of the cables which can be restored using the inventive method are polyolefins. The term "polyolefin" as used in the present application is understood to mean polyolefin and copolymers thereof. The polyolefins include solid polymers of olefins, particularly alpha-olefins, which comprise from about two to six carbon atoms, e.g. crosslinkable and noncrosslinkable polyethylene, polypropylene, polybutene, polyisobutylene, poly(4-methyl pentene), and the like. Copolymers of ethylene and other compounds interpolymerizable with ethylene such as butene-1, pentene-1, propylene, styrene and the like may be employed. In general the copolymer will be comprised of more than 50 per cent by weight ethylene.

Suitable examples of olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like.

Specific examples of olefin-allyl copolymers include ethylene-allyl benzene, ethylene-allyl ether, and ethyleneacrolein. However, the preferred polymer insulation is polyolefin, the most preferred is polyethylene.

The anti-treeing fluid can be supplied to the interstices of the distribution cable several ways. A vacuum can be applied to one end of the cable and the fluid drawn through the cable from a reservoir of the fluid.

Alternately, a reservoir of the fluid can be pressurized forcing the fluid through the cable. Furthermore, it is understood that the present method can be practiced with additional steps. For instance, as a step preliminary to introducing the organosilicon fluid, a dessicant gas such as $N_2$ could be pumped or drawn through the cable in order to purge the cable of water moisture.

The following examples illustrate the invention without demonstrating the full scope of the invention.

EXAMPLE 1

A multistranded conductor cable was aged by immersing it in water and subjecting it to high electrical fields for 12 months and the average breakdown point of three samples of the cable was determined. The cable was then dried by passing dry nitrogen through the interstices of the cable for six weeks. After drying, a supply of a liquid initially comprised of the silane phenylmethyldimethoxysilane was supplied to the interstices of the cable for 6 weeks. The average breakdown point of the cable as measured in the test was:

170 kV: new cable
72 kV: for the aged cable
123 kV: for cable dried for six weeks and supplied with organosilicon fluid for six weeks.

The degree of restoration of the treated cables is equivalent to cables restored using the prior art methods which employ the volatile tree retardant liquid acetophenone. Since the tree retardant liquid used in the present method will become more viscous, one would expect cable restored by the inventive method to be more durably restored than cable restored by supplying acetophenone to cable.

EXAMPLE 2

The viscosity of phenyltrimethoxysilane was monitored with various levels of various organometallic condensation catalysts present in the fluid. The viscosity of each sample was measured at 25° C. The results are reported in Table 1 and show that the rate of increase in viscosity in the fluid can be controlled by variation of the catalyst and catalyst level. For instance, the viscosity of phenyltrimethoxysilane fluid can be increased from less than 10 centistokes initially to more than 60,000 centistokes in 1100 hours at room temperature and pressure in the presence of atmospheric moisture, by including in said fluid 0.4 wt % tetraisopropyltitanate (TIPT) or 0.1 wt % dibutyltindilaurate (DBTDL), or 0.2 wt % TIPT, or 0.1 wt % TIPT, whereas the same fluid with no catalyst has a viscosity of 6,000 centistokes after 1100 hours under the same conditions. This shows that the viscosity of the tree retardant liquid, and hence its ability to impregnate and or exude from the insulation material, can be controlled.

TABLE 1

PhSi(OMe)$_3$; Viscosity Change (Centistokes At 25° C.) vs Time

| Hours | DBTDL | | | TITP | | | No Catalyst |
|---|---|---|---|---|---|---|---|
| | 0.1 | 0.2 | 0.4 | 0.1 | 0.2 | 0.4 | |
| 0 | <10 | <10 | <10 | <10 | <10 | <10 | <10 |
| 25 | <10 | <10 | <10 | <10 | <10 | <10 | <10 |
| 95 | 10 | 15 | 20 | 55 | 75 | 89 | <10 |
| 143 | 20 | 30 | 65 | 150 | 230 | 300 | <10 |
| 190 | 45 | 82 | 225 | 455 | 620 | 740 | 25 |
| 262 | 130 | 270 | 775 | 1090 | 1420 | 1590 | 50 |
| 334 | 365 | 895 | 1490 | 2260 | 2965 | 3020 | 105 |
| 430 | 1030 | 2610 | 2100 | 4120 | 5370 | 4960 | 175 |

TABLE 1-continued

PhSi(OMe)$_3$; Viscosity Change (Centistokes At 25° C.) vs Time

| Hours | DBTDL | | | TITP | | | No Catalyst |
|---|---|---|---|---|---|---|---|
| | 0.1 | 0.2 | 0.4 | 0.1 | 0.2 | 0.4 | |
| 598 | 4050 | 6270 | 2115 | 6570 | 8380 | 9340 | 405 |
| 768 | 15400 | 12600 | 2900 | 15000 | 17400 | 18500 | 540 |
| 1104 | 100000 | 27500 | 5500 | 61700 | 80200 | 88500 | 5400 |
| 1992 | 750000 | 36000 | 6500 | 340000 | 600000 | 490000 | 53000 |

EXAMPLE 3

The viscosity of phenylmethyldimethoxysilane fluid at 25° C. was monitored with time at various condensation catalyst levels. All aging tests were conducted at 25° C., 1 atmosphere pressure, in the presence of atmospheric moisture. The fluid had an initial viscosity of less than 10 centistokes and increased with time in the presence of atmospheric moisture. Dibutyltindilaurate increased the viscosity the most rapidly, with a sample containing 0.4 wt % of this catalyst achieving a viscosity of greater than 10,000 centistokes in less than 1200 hours. 0.2 wt % of the same catalyst achieved a viscosity of 8000 centistokes in about 2000 hours, and the same catalyst at 0.1 wt % levels achieved a viscosity of about 2000 centistokes in 2200 hours. This clearly demonstrates that the rate of increase in viscosity of the phenylmethyldimethoxysilane fluid can be controlled through catalyst concentration. The results of the tests are summarized in Table No. 2.

TABLE 2

PhMe(OMe)$_2$Si; Viscosity Change (centistokes at 25° C.) vs Time

| Hours | DBTDL | | | TIPT | | | No Catalyst |
|---|---|---|---|---|---|---|---|
| | 0.1% | 0.2% | 0.4% | 0.1% | 0.2% | 0.4% | |
| 0 | <10 | <10 | <10 | <10 | <10 | <10 | <10 |
| 44 | <10 | <10 | <10 | <10 | <10 | <10 | <10 |
| 72 | <10 | <10 | <10 | <10 | <10 | <10 | <10 |
| 164 | <10 | <10 | 10 | 12 | 15 | 35 | <10 |
| 212 | <10 | 12 | 35 | 25 | 35 | 65 | <10 |
| 260 | <10 | 20 | 55 | 40 | 55 | 80 | <10 |
| 332 | 10 | 45 | 100 | 65 | 75 | 80 | <10 |
| 380 | 10 | 60 | 160 | 75 | 102 | 103 | <10 |
| 428 | 10 | 93 | 250 | 130 | 140 | 130 | <10 |
| 500 | 20 | 125 | 405 | 160 | 170 | 130 | <10 |
| 572 | 25 | 200 | 635 | 200 | 180 | 155 | <10 |
| 668 | 35 | 315 | 1100 | 205 | 190 | 155 | <10 |
| 830 | 80 | 615 | 2205 | 280 | 205 | 195 | <10 |
| 956 | 200 | 1360 | 4525 | 260 | 290 | 235 | <10 |
| 1292 | 785 | 3965 | 15675 | 445 | 485 | 460 | <10 |
| 2108 | 1935 | 8900 | 40000 | 830 | 855 | 940 | <10 |

EXAMPLE 4

This example demonstrates the rate at which phenylmethyldimethoxysilane impregnates polyolefin insulation material used to insulate 15 kilovolt distribution cables. Nine inch portions of 15 kilovolt cable were cut from a spool of cable. The conductor was pulled from each section and one end of the resulting tube was plugged. The tube was weighed and filled with either phenylmethyldimethoxysilane or acetophenone, a state of the art and highly volatile tree retardant liquid. The filled tube was capped and placed in water. At various times the tube was removed, emptied, washed, dried and weighed to determine the amount of tree retardant which had been absorbed by the insulation material. The results of the test are summarized in Table No. 3, and demonstrate that phenylmethyldimethoxysilane absorbs into insulation material on a weight basis at least as rapidly as acetophenone.

TABLE 3

| | Weight % Gain of 15 Kv Insulation Immersed in Tree Retardant Liquid | | |
|---|---|---|---|
| Hours | PhMeSi(OMe)$_2$ | PhSi(OMe)$_3$ | Acetophenone |
| 0 | 0 | 0 | 0 |
| 24 | 0.53 | 0.39 | 0.58 |
| 48 | 0.71 | 0.51 | — |
| 72 | 0.81 | 0.61 | — |
| 144 | 1.12 | 0.93 | 1.46 |
| 216 | 1.46 | 1.08 | 1.66 |
| 312 | 1.75 | 1.23 | 1.78 |
| 480 | 1.99 | 1.41 | 1.78 |
| 672 | 2.04 | 1.46 | — |
| 864 | 2.12 | 1.59 | 1.78 |
| 984 | 2.07 | 1.65 | 1.78 |
| 2184 | 2.05 | 2.21 | 1.98 |

What is claimed is:

1. A method of restoring a polyolefin insulated cable having water-containing tree voids in its insulation, comprising:

supplying the interstices of the stranded conductor portion of said cable with an organosilicon fluid which comprises aromatic radical containing silanes or partial hydrolyzates and condensates thereof, of the general formula $$(RO)_x SiR'_y Ar_{(4-x-y)}$$

where R denotes an alkyl radical with 1 to 6 carbon atoms, R' denotes an alkyl radical with 1 to 6 carbon atoms, Ar denotes an aromatic organic radical chosen from the group consisting of phenyl and benzyl radicals, x is 1, 2 or 3, y is 0, 1 or 2, $x+y \leq 3$, where said organosilicon fluid has an initial kinematic viscosity at 25° C. of less than 20 centistokes, whereby said organosilicon fluid is absorbed by said insulation and subsequently polymerizes within said tree voids by reacting with the water contained therein.

2. The method described in claim 1 wherein said organosilicon fluid further comprises a hydrolysis condensation catalyst in sufficient quantity to increase the kinematic viscosity of said fluid from less than 20 centistokes at 25° C. to more than 100 centistokes at 25° C. in less than 2000 hours at room temperature and pressure in the presence of atmospheric moisture.

3. The method of claim 1 wherein said organosilicon fluid comprises by weight;
   (a) 5 to 95 percent phenylmethyldimethoxysilane; and
   (b) 5 to 95 percent phenyltrimethoxysilane.

4. The method of claim 1 wherein said organosilicon fluid comprises by weight about 100 percent phenylmethyldimethoxysilane.

5. The method of claim 1 wherein said organosilicon fluid comprises by weight about 100 percent phenyltrimethoxysilane.

6. The method of claim 2 wherein said organosilicon fluid comprises by weight;
   (a) 80 to 95 percent phenylmethyldimethoxysilane; and
   (b) 5 to 20 percent phenyltrimethoxysilane.

7. The method of claim 6 wherein said hydrolysis condensation catalyst is chosen from the group consisting of dibutyltindilaurate, dibutyltindiacetate, dibutyltindioctoate, stannous octoate, dimethyltinneodeconoate, di-N-octyltin-S, S-isooctylmercaptoacetate, dibutyltin-S, S-dimethylmercaptoacetate, or diethyltin-S, S-dibutylmercaptoacetate.

8. The method of claim 7 wherein the hydrolysis condensation catalyst is present between 0.05 and 5 wt percent of the organosilicon fluid.

9. The method of claim 8 wherein said hydrolysis condensation catalyst is dibutyltindilaurate.

10. The method of claim 1 which further comprises purging the interstices of the stranded conductor with a dessicant gas prior to supplying said interstices with organosilicon fluid.

* * * * *